Aug. 3, 1954     P. SCHELL     2,685,412
MODULATING GAS HEATING CONTROL
Filed Sept. 8, 1951
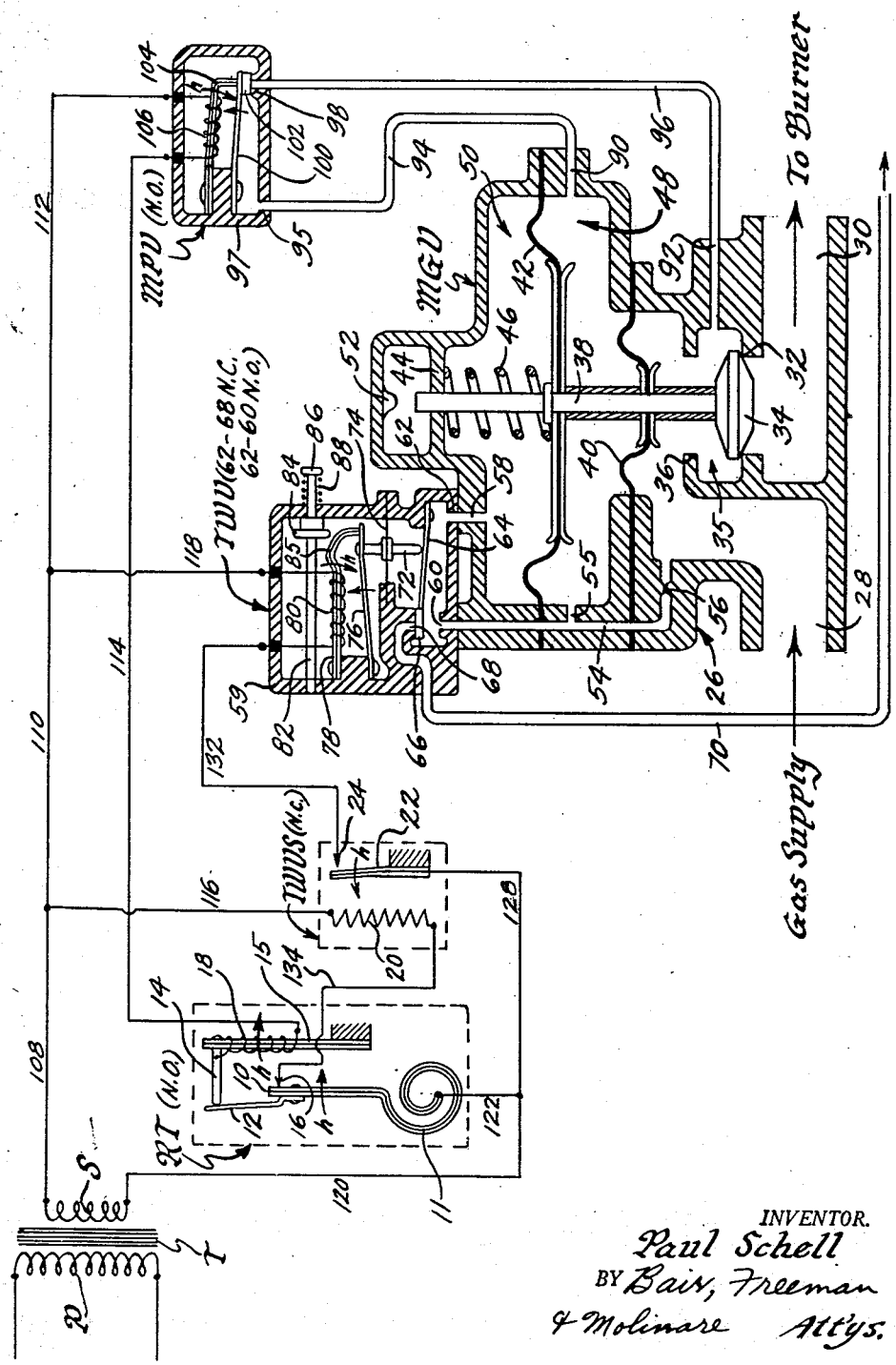
INVENTOR.
Paul Schell
BY Bair, Freeman
& Molinare   Att'ys.

Patented Aug. 3, 1954

2,685,412

UNITED STATES PATENT OFFICE 2,685,412

MODULATING GAS HEATING CONTROL

Paul Schell, Elkhart, Ind., assignor to Penn Controls, Inc., Goshen, Ind., a corporation of Indiana Application September 8, 1951, Serial No. 245,743

2 Claims. (Cl. 236—68)

This invention relates to a gas modulating heating control wherein a main gas valve of the modulating type having an on-off seat and a modulating seat is provided, automatic control thereof being effected by a novel room thermostat, and circuit and pilot control devices in a novel control arrangement.

One object of my present invention is to provide pilot control for a main gas valve of modulating type involving relatively simple instrumentalities which operate to control the flow of gas through the gas valve by means of using the gas pressure itself acting on diaphragms thereof, the control instrumentalities being in the form of valves which are electrically operated, and a room thermostat being provided for controlling the flow of the electric current to the control instrumentalities in an efficient and foolproof manner.

Another object is to provide the room thermostat so arranged as to effect modulating control by reason of having primary and secondary contacts, one of which is carried by heat responsive actuator, the room thermostat having a modulating heater for the actuator energized by closure of the circuit through the contact carried thereby to move said contact out of engagement with its cooperating contact, the modulating heater being heated as a result of closure of these contacts, and then, as a result of opening of the contacts, cooling again and thus causing the heat responsive actuator to produce a follow-up action that changes the frequency and length of electrical impulses to a heater in one of the instrumentalities for controlling the gas valve in a modulating manner.

Still another object is to provide in combination with a modulating main gas valve having a diaphragm and chamber arrangement, a modulating pilot valve for controlling the modulating action of the gas valve and a three-way valve for controlling the on-off positioning of the main gas valve.

A further object is to provide the modulating pilot valve and the three-way valve electrically operable as by means of electric heaters which affect bimetal or similar warping elements, and then, in turn actuate the valves of the modulating pilot valve and the three-way valve, a room thermostat of modulating type being provided for controlling the energization of the heaters.

Still a further object is to provide a three-way valve switch for controlling the actuating heater of the three-way valve so that its circuit may be closed when a predetermined circuit of the room thermostat is opened, and may be opened when said predetermined circuit of the room thermostat is closed for providing operation of the three-way valve in response to the room thermostat when it responds to temperature rise.

An additional object is to provide a control of the character disclosed in which the modulating pilot valve is modulated by a modulating heater arrangement of the room thermostat which senses temperature changes of the room and relays them in varying increments of electrical energization of the actuating heater of the modulating pilot valve to cause it to modulate in proportion to changes in room temperature and thus serve as a pilot to accurately modulate the main gas valve to supply the proper amount of gas to the burner and result in maintaining the temperature in the room substantially constant.

With these and other objects in view, my invention consists in the construction, arrangement and combination of the various parts of my modulating gas heating control whereby the objects contemplated are attained, as hereinafter more fully set forth, pointed out in my claims and illustrated in the accompanying drawings, wherein:

The figure is a diagrammatic showing of my gas modulating heating control in which the valve structures are shown in cross section in a mechanical part of the diagram and the circuits for them and for the room thermostat are shown in an electro-diagrammatic portion of the figure.

On the accompanying drawing I have used the reference character RT to indicate a room thermostat which is "normally open" as indicated (N. O.) following the designation RT. The room thermostat RT includes a secondary switch blade 10 actuated by a bimetal coil 11 responsive to room temperature in the usual manner. Upon temperature rise the blade 10 swings to the right as indicated by the arrow h indicating "hot." The room thermostat is shown on the drawing in the non-normal or closed position.

The room thermostat RT comprises a primary blade 12 and a primary contact 14 for coaction therewith, a secondary contact 16 being provided for coaction with the secondary blade 10. In the cold position of the room thermostat both blades 10 and 12 are separated from the respective contacts 16 and 14. Upon temperature rise the blade 12 engages the contact 14 ahead of engagement of the blade 10 with the contact 16. "Primary" and "secondary," therefore, refer to the order of closing of the contacts 12—14 and 10—16.

The room thermostat further includes a heat responsive contact actuator 15 on which the primary contact 14 is mounted. This actuator may be in the form of a bimetal blade which is somewhat more flexible than the bimetal 11 and which, when heat is applied thereto as from a modulating heater 18, will move in the direction of the arrow $h$ crossing the bimetal blade and thus tend to separate the contact 14 from the contact 12 as soon as they are engaged and thereby again de-energize the modulating heater 18 as it is energized whenever the contacts 12 and 14 are closed.

A three-way valve switch TWVS is provided having a switch actuator in the form of a bimetal blade 22 and a contact 24 for coaction therewith. The bimetal switch actuator 22 warps to the left when heated as indicated by the arrow $h$. For heating the blade a three-way valve switch heater 20 is provided. The contacts 22 and 24 of the three-way valve switch are normally closed as indicated on the drawing by (N. C.) following the reference character TWVS.

At MGV a modulating main gas valve is indicated, the valve body of which bears the reference numeral 26. The body 26 has an inlet 28 from the gas supply and an outlet 30 to the burner. Within the valve body an on-off valve seat 32 is provided with which a valve disc 34 is normally engaged under the action of a spring 46. Opposite the seat 32 is a modulating valve seat 36 and between these seats is an interseat chamber 35.

A valve stem 38 is connected with the valve disc 34 and seal-off diaphragms 40 and 42 are connected therewith and with the valve body as illustrated. The diaphragms provide first and second chambers 48 and 50. The upper end of the valve stem 38 extends through a valve stem guide 44 and the valve body may have means 52 to serve as a stop for the valve stem 38 in a desirable minimum flame position of the valve disc 34 relative to the modulating seat 36.

Passageway means is provided in the valve body 26 at 54 and a restriction 56 therein causes 54 to constitute a restricted passageway means to an "off" seat 60 of a three-way valve TWV having a body 59, and through a lateral passageway 55 to the first chamber 48 between the diaphragms 40 and 42. A passageway 58 is provided through the top of the valve body 26 for communicating a passageway 62 of the three-way valve TWV with the second chamber 50 above the diaphragm 42.

The three-way valve TWV has a valve blade 64 of spring material carrying a valve disc 66. The blade 64 is so shaped as to normally seat the disc 66 against an "on" seat 68 formed in the body 59 of the three-way valve TWV. A bleed-off connection 70 is provided from the "on" seat 68 to the burner chamber adjacent the burner therein.

A valve stem 72 is provided for actuating the valve disc 66 with respect to the seats 60 and 68 and it is provided with a seal-off diaphragm 74 to seal the seats 60, 62 and 68 relative to atmosphere through that portion of the valve body 59 above the diaphragm, which portion is in communication with atmosphere.

A valve return leaf spring 76 is provided for normally lifting the valve stem 72 and an electrically operated actuator is provided in the form of a bimetal actuator 78 which, when heated, will warp downwardly and engage the valve return spring 76 to propel the stem 72 downwardly and close the valve disc 66 against the valve seat 60 after separating it from the seat 68. An electrically energizable actuating heater is provided for the bimetal element and is shown at 80.

I provide manual resetting means for the three-way valve TWV which consists of a reset rod 82 having a flange 84 thereon to coact with a hump 85 of the bimetal element 78 as will be hereinafter described. A reset knob 86 is provided on the rod 82 and a reset return spring 88 encircles the rod under the knob.

The parts of the three-way valve TWV are normally in the position shown in the drawing and a legend following the reference character TWV indicates that the valve disc 66 normally closes 62 with respect to 68 and normally opens 62 with respect to 60.

The right hand side of the main gas valve body 26 is provided with a passageway 90 to the first chamber 48 and a passageway 92 to the interseat chamber 35. A modulating pilot valve MPV (normally open) is provided having a passageway 95 from which a connection 94 leads to the passageway 90, the body of the valve being indicated at 97. This valve body has therein a seat 98 connected by a conduit 96 to the passageway 92. A valve disc 102 is mounted on a valve blade 100 which blade is biased upwardly to space the disc 102 from the seat 98 and thereby open 95 with respect to 98.

For closing the disc 102 against the seat 98 and for modulating the disc relative to the seat in the normally open position, I provide a bimetal valve actuating blade 104, and an electrically energizable actuating heater 106 is wound thereon for changing the position of the bimetal blade 104 in response to the duration and frequency of energization of the heater 106, as determined by the action of the room thermostat blade 10 and the actuator 15 of the room thermostat.

The foregoing elements are connected in an electric circuit which may include a step-down transformer T having a primary P and a secondary S so that comparatively safe low voltage may be used for actuating the various elements of my control. The elements thus far described are connected together with wires 108 to 134 as shown on the drawing and these wires will be referred to specifically hereinafter when describing the operation of the control.

*Practical operation*

As shown on the drawing, the various parts of my control are in the position which they assume as a result of the room thermostat RT being satisfied. The three-way valve switch heater 20 is energized through the elements 108, 116, (20), 134, 16, 10, 11, 122 and 120. The bimetal blade 22 thereof is accordingly in position for opening the circuit of the heater 80 of the three-way valve TWV. The valve therefore is in the normal position which results in the modulating gas valve MGV being closed (disc 34 against on-off seat 32). This results from gas through the restricted passageway means 54—56 flowing through 60, 62 and 58 into the second chamber 50, thus balancing the pressure in this chamber with respect to the pressure through 55 in the first chamber 48. The spring 46 is therefore effective to hold the valve disc 34 closed against the seat 32.

Since the primary contacts 12 and 14 of the room thermostat RT are closed, the heater 106 of the modulating pilot valve MPV is energized through 108, 110, 112 (106), 114, 18, 14, 12, 10, 11, 122 and 120. The valve disc 102 is therefore seated against the seat 98 to cut off communication between the interseat chamber 35 and the first chamber 48 of the main gas valve.

As the room temperature goes down, the bimetal 11 of the room thermostat will unwind and swing the blade 10 toward the left thus breaking the circuit at 10—16 (the secondary contacts) of the room thermostat. This deenergizes the heater 20 so that the three-way valve switch TWVS will close a circuit through its contacts 22 and 24. This is the circuit for the heater 80 through 108, 110, 118, (80), 132, 24, 22, 128 and 120.

As the heater 80 heats up, it warps the bimetal blade 78 downwardly against the upward bias of the valve return spring 76 thus driving the stem 72 downwardly and transferring the valve disc 66 from the "on" seat 68 to the "off" seat 60. This cuts off the flow of gas from the passageway 54 through 60, 62 and 58 to the second chamber 50 of the main gas valve and opens this chamber through 58, 60, and 68 to the bleed-off connection 70. The gas under pressure in the chamber 50 is therefore bled off to reduce this chamber to substantially atmospheric pressure so that the pressure from the inlet 28 under the diaphragm 40 and through the restricted passage means 54—56 and the lateral passageway 55 to the primary chamber 48 under the diaphragm 42 will result in upward movement of the valve stem 38 to open the gas valve disc 34 relative to the on-off seat 32 and bring it adjacent but spaced from the modulating seat 36 as determined by the minimum flame stop 52. The modulating gas valve is now open so that gas through the burner flows through the valve and of course is ignited in any suitable manner at the burner.

Assuming that the room temperature will continue to lower and after a fractional degree of temperature drop will open the room thermostat at the primary contacts 12—14. This permits deenergization of the modulating heater. The heater 106 of the modulating pilot valve MPV is thereby de-energized and the bimetal element 104 thereof will begin to warp upwardly for opening the valve disc 102 with respect to the valve seat 98. This permits bleed-off of the pressure in the first chamber 48 of the modulating gas valve to the interseat chamber 35 from which it flows into the burner chamber to be disposed of by burning therein.

Reduction of pressure in the chamber 48 will permit the disc 34 to move away from the modulating seat 36 and the degree of such movement will be dependent upon the degree of opening of the disc 102 relative to the seat 98 of the modulating pilot valve. The passageways 90, 94, 95, 98, 96 and 92 for this purpose are larger than the restriction 56 so as to let the gas under pressure out of the chamber 48 faster than it enters from the intake 28 if the gas valve is to be modulated to a wider open position. On the other hand, if it is to be modulated to a more closed position with relation to the seat 36, the valve 102 restricts the flow from 90 to 92 more than it restricts 56, the position of the valve disc 102 being dependent on the position or degree of warping of the bimetal element 104.

As soon as the contacts 12 and 14 are separated, the flow of current through the modulating heater 18 is also discontinued so that the bimetal actuator 15 will be cooled by the surrounding atmosphere in the room thermostat and will close 14 against 12 even though the room temperature is dropping. Reclosure of 12 and 14 re-energizes the modulating heater 18 and the heater 106 of the modulating pilot valve so that they receive a "shot" of current and therefore tend to warp toward the right and downwardly again respectively during the short period of energization of their heaters. The energization of the heater 106 is such that it adds or reduces the heat affecting the bimetal 104 in the inverse ratio to the requirements of the space being heated.

The contacts in the room thermostat are of the walking type which means that more or less heat can be added to the bimetal 104 by very slight effects of room temperature on the room thermostat. The greater the period of energization of the heater 106, the more nearly closed will be the modulating pilot valve and likewise the more open will be the modulating gas valve (its valve disc 34 relative to the modulating seat 36).

The alternate openings and closings of the primary contacts 12 and 14 are repeated periodically with a rapidity depending upon the demand for heat as indicated by the bimetal 11. This action causes proportional amounts of heat in the heaters 18 and 106 to affect the bimetal elements 15 and 104 so that varying amounts of heat are supplied to control the modulating pilot valve as directed by the bimetal 11 of the room thermostat. As the circuit is arranged in my disclosure, a lesser amount of heat is supplied to these heaters as room temperature lowers.

As the bimetal 11 is affected by a rising room temperature and moves toward the modulating actuator 15, it raises the amount of heat supplied to the heater 106 and thus reduces the flame at the main burner. Further increase in room temperature closes the secondary contacts 10—16 which, after a predetermined short period of time turn off the main valve by opening the three-way valve switch TWVS and thereby actuate the three-way valve TWV to its normal position. These operations are performed with a relatively small amount of change in room temperature, the room thermostat being preferably very sensitive to temperature changes.

From the foregoing description it will be obvious that the first demand for heat by the room thermostat opens the modulating gas valve to its fully modulated position (minimum position as determined by the stop 52) and any additional demand of the room thermostat for heat in the space being heated reduces the heat applied to the bimetal 104 of the modulating pilot valve by the heater 106 and results in opening the modulating gas valve to a further open position. The modulating heater 18 cooperates with the room thermostat in such manner as to vary the frequency and periods of energization of the heater 106 and in actual practice the room thermostat contacts cycle rather rapidly so that the amount of heat affecting the bimetal 104 of the modulating pilot valve, even though it is caused by impulses of varying amounts and duration of current energizing the heater 106, averages out to a certain value depending on the effect of the room thermostat upon the circuit.

The room thermostat part of the modulating circuit may be considered as a sender and the heater 106 as a receiver in which the sender, under certain conditions, may cycle at a rate for example of one second "on" and two seconds "off." This rate will vary to greater or lesser proportions of the time "on" as indicated by the temperature of the surroundings which affect the bimetal 11, and also the voltage as applied to the circuit. The receiver may be, however not necessarily is, of somewhat greater mass than that of the sender and the response will be that indicated by an integration of the "on" and "off" timing of the sender. In actual practice, I have found that the receiver is very smooth in operation even though sudden changes are transmitted to it by the sender, and also is relatively quick in its response to any changes by the sender as it responds to room temperature changes.

The room thermostat is a two-stage type in which the contacts closing first are those which supply current to the modulating pilot valve which in turn controls the modulating gas valve, this valve being the main valve between the gas supply and the burner. The contacts that close second are for controlling the on and off positions of the main valve so that in a certain temperature range the main valve is modulated between minimum flame position and maximum opening, but at a slightly higher temperature is cut off entirely. Then when the room thermostat again calls for heat, the secondary contacts open first to turn the valve on to its minimum modulating position and thereafter the primary contacts and the modulating heater 18 cooperating therewith control the main valve in modulating manner.

My disclosed modulating gas heating control is a comparatively simple arrangement of two pilot valves for a modulating gas valve in which one of the pilot valves effects the on-off control of the gas valve and the other effects modulation thereof. The pilot valves are controlled in a simple yet effective manner by a two stage thermostat having therein the modulating heater 18 to secure the desired cycling of the room thermostat to effect primarily modulation and secondarily modulation of the gas valve under the control of the pilot valves.

The three-way valve TWV is preferably of the snap acting type and is provided with a manual reset mechanism 82—84, 85, 86, 88 so that the modulating gas valve can be opened under manual control by pressure inwardly on the reset knob 86. This causes the flange 84 to ride over the hump 85 and move the valve disc 66 to the non-normal position (seated against the valve 69). Thereupon the gas in the chamber 50 is reduced through the bleed-off passageway 70 for permitting the pressure under the diaphragm 42 to open the valve to its modulating position against the action of the spring 46. Thereafter when current flows in the heater 80, the bimetal 78 will warp downwardly for releasing the hump 85 from the flange 84 and the spring 88 will return the manual reset to its normal position and permit subsequent automatic operation of the three-way valve in the normal manner.

The modulating gas heating control herein disclosed is in some respects similar to that disclosed in the copending application of Paul Penn, Ralph S. Penn and myself, Serial No. 222,168, filed April 21, 1951, but utilizes a different room thermostat arrangement for closer modulating control of the heater 106. The room thermostat in the present application includes the modulating heater 18; whereas in the copending application referred to, an accelerating heater for the bimetal 11 was used. The claims hereto appended are drawn to this difference in construction and operation of the control.

The modulating heater 18 is preferably mounted in the room thermostat above the bimetal element 11 so that its heat does not affect the element. The herein disclosed arrangement provides a room thermostat which has a quicker response so that cycling of the valve MGV is faster, and therefore results in the main gas valve being modulated to secure control of room temperature more closely following changes in the room temperature.

Some changes may be made in the construction and arrangement of the parts of my modulating gas heating control without departing from the real spirit and purpose of my invention, and it is my intention to cover by my claims any modified forms of structure or use of mechanical equivalents which may be reasonably included within their scope.

I claim as my invention:

1. In a modulating gas heating control, a modulating gas valve having an on-off seat, a modulating seat, an interseat chamber between said seats and a valve plug in said chamber to coact with said seats, a first diaphragm dividing the valve body into first and second chambers, a second diaphragm isolating said first chamber from said valve seats, a stem connection between said valve plug and said diaphragms, restricted passageway means continuously supplying gas to said first chamber, a modulating pilot valve connecting said first chamber with said second chamber, an electrically operated actuating mechanism therefor, a three-way valve for connecting said second chamber to either said restricted passageway means for admitting gas thereto to close said valve plug on said on-off seat or for exhausting gas therefrom to open said valve plug relative to said on-off seat, an electrically operated actuator for said three-way valve, a room thermostat having primary and secondary contacts, means for varying the position of engagement of said primary contacts, said primary contacts closing ahead of said secondary contacts on temperature rise affecting said room thermostat, said primary contacts being in circuit with said modulating pilot valve actuator to energize it when a circuit is established by closure of said primary contacts upon the room thermostat responding to room temperature rise and to thereby close said modulating pilot valve to permit increase of pressure in said first chamber from said restricted passageway means to move said valve plug toward said modulating seat for reducing gas flow through said gas valve, said means for varying the position of engagement of said primary contacts comprising a heater in series with said primary contacts so as to be energized when they are closed and a warp element carrying one of said primary contacts and moving it toward open position when heated, and said secondary contacts being in circuit with said three-way valve actuator to cause said three-way valve to connect said second chamber to said restricted passageway means and thereby effect closure of said valve plug on said on-off seat.

2. A normally closed modulating gas valve having an on-off seat, a modulating seat, an interseat chamber between said seats and a valve plug in said chamber to coact with said seats, a first diaphragm dividing the valve body into first and second chambers, a second diaphragm isolating said first chamber from said valve seats, a stem connection between said valve plug and said diaphragms, passageway means continuously supplying gas to said first chamber, a modulating pilot valve connecting said first chamber with said second chamber, an electrically operated actuator therefor, a three-way valve for connecting said second chamber to either said passageway means for admitting gas thereto to close said valve plug on said on-off seat or for exhausting gas therefrom to open said valve plug relative to said on-off seat, said three-way valve being normally in the first position, an electrically operated actuator for said three-way valve for causing it to connect said second chamber to the burner when the actuator is energized, a room thermostat having primary and secondary contacts, said primary contacts closing ahead of said secondary contacts on temperature rise affecting said room thermostat, a bimetal element supporting one of said contacts and moving it toward circuit opening position when heated, a heater for said bimetal element, said primary contacts being in circuit with said modulating pilot valve actuator to energize it when a circuit is established through said room thermostat upon the same responding to temperature rise and to thereby close said modulating pilot valve to permit increase of pressure in said first chamber from said passageway means to move said valve plug toward said modulating seat for reducing gas flow through said gas valve, said heater being in series with said primary contacts so as to be energized when they are closed, and means for connecting said secondary contacts in circuit with said three-way valve actuator, said last means comprising a thermal responsive switch for energizing said three-way valve actuator and a heater controlled by said secondary contacts of said room thermostat and operable to open said thermal responsive switch.

References Cited in the file of this patent

UNITED STATES PATENTS

| Number | Name | Date |
| --- | --- | --- |
| 2,263,574 | Gille | Nov. 25, 1941 |
| 2,285,913 | Derrah | June 9, 1942 |
| 2,328,279 | Jones | Aug. 31, 1943 |
| 2,490,420 | Davis | Dec. 6, 1949 |
| 2,587,733 | Jones | Mar. 4, 1952 |

FOREIGN PATENTS

| Number | Country | Date |
| --- | --- | --- |
| 711,150 | France | June 23, 1931 |